United States Patent [19]

Niederhuefner et al.

[11] Patent Number: 4,876,417

[45] Date of Patent: Oct. 24, 1989

[54] COMBINED HIGH VOLTAGE CONNECTING AND GROUNDING SWITCH

[75] Inventors: Detlev Niederhuefner; Guenter Hahn; Andrzej Baczyzmalski, all of Berlin, Fed. Rep. of Germany

[73] Assignee: Siemens Aktiengesellschaft, Berlin and Munich, Fed. Rep. of Germany

[21] Appl. No.: 300,674

[22] Filed: Jan. 23, 1989

[30] Foreign Application Priority Data

Jan. 25, 1988 [DE] Fed. Rep. of Germany ....... 3802394

[51] Int. Cl.⁴ ............................................. H01H 31/00
[52] U.S. Cl. .................................... 200/48 V; 343/883
[58] Field of Search ...................... 200/500, 501, 48 V, 200/4 A, 48 R; 200/48 CB, 48 SB; 343/883, 901

[56] References Cited

U.S. PATENT DOCUMENTS

| | | | |
|---|---|---|---|
| 2,863,019 | 12/1958 | Klimesch | 200/48 R |
| 3,179,760 | 4/1965 | Forwald | 200/48 V |
| 3,350,520 | 10/1967 | Perry et al. | 200/48 V |
| 3,657,495 | 4/1972 | Charamel et al. | 200/48 R |
| 4,062,156 | 12/1977 | Roth | 343/883 |
| 4,568,808 | 2/1986 | Thumes et al. | 200/48 V |

FOREIGN PATENT DOCUMENTS 1110269  1/1962  Fed. Rep. of Germany .

*Primary Examiner*—Henry J. Recla
*Assistant Examiner*—Glenn T. Barrett
*Attorney, Agent, or Firm*—James G. Morrow

[57] ABSTRACT

A combined disconnecting and grounding switch for high voltage use. A space-saving arrangement providing for automatic grounding when the switch is in an open circuit position. The disconnecting and grounding switch including a connection contact connectable with a contact having a high voltage potential wherein the contacts are vertically arranged one over the other. The switch also includes a switch rod designed to be vertically displaceable in its longitudinal direction. The switch rod has an upper conductive section and an adjoining lower non-conductive section. The switch rod can be moved up or down by a driving arrangement including a threaded shaft driven by a motor and a traveling nut assembly cooperating with the threaded shaft.

6 Claims, 2 Drawing Sheets

4,876,417

COMBINED HIGH VOLTAGE CONNECTING AND GROUNDING SWITCH

BACKGROUND OF THE INVENTION

This invention relates to a combined high voltage disconnecting and grounding switch having a vertical switching movement, the switch being adapted for connection with a high-voltage cable.

High-voltage disconnecting switches are known in various forms, for example, as rotary or grip-lever type switches. A combined switching device is also known (DE-C-1 110 269) in which a switch rod traveling in a straight line serves as a grounding member, and in which a pantograph arrangement is provided as the disconnecting member. The two parts of the switch can be operated independently of each other.

In testing installations for high-voltage cables, voltages of 600 kV and higher must be controlled. Disconnecting switches available for use with voltages of this magnitude are normally designed for open-air use and, in many cases, have relatively large dimensions. Thus, these disconnecting switches are difficult to locate in many enclosed spaces. In view of this, it is the object of the invention to provide a space-saving disconnecting switch that can be used indoors and can perform the function of a ground during the switched-off state without enlarging its dimensions.

BRIEF DESCRIPTION OF THE INVENTION

Accordingly, there is provided a high voltage disconnecting and grounding switch having a vertical switching movement comprising: a first contact adapted to have a high voltage potential; a connection contact having an open-circuit position connectable with the first contact, the first contact and connection contact being arranged vertically one above the other; grounding contact; and a switch rod which is vertically translatable along its longitudinal axis, the switch rod including a conductive section for coupling the connection contact to the first contact and a non-conductive section, wherein the switch rod cooperates with a grounding contact to ground the connection contact in the open-circuit position. The length of the conductive section corresponding to the distance between the contacts.

An advantage of the switch is that it eliminates the need for additional grounding apparatus or similar components that must be operated separately and require an additional drive.

Another advantage of the switch is that a space-saving arrangement can be achieved by arranging the connection contact on or near the header of a cable terminal and arranging the grounding contact on the grounded flange of the cable terminal. In one embodiment of the switch, the grounding contact can be formed as a sliding contact encircling the switch rod to provide a reliable contact between the grounding contact and the switch rod.

Another advantage of the switch is that the switch can be used with a drive for the switch rod which can contribute to a size reduction. One embodiment of the drive includes a drive motor, a threaded shaft, and a travelling nut. Speed reducing mechanisms can be eliminated for reducing drive motor speeds by using multi-pole drive motors.

In some situations, it is useful to use the disconnecting and grounding switch for indoor use with operating voltages near 600 kV. For certain indoor applications, cables for connection to the switch are brought into a building through a conventional cable well, wherein a cable terminal is located on the top cover of the cable well. An advantage of the switch is that the aforementioned driving motor and the pertinent driving members can be located in the cable well adjacent to the location where the cables are led into the well. This results in a corresponding reduction in the height of the switching setup which is advantageous where the distance between the building floor and ceiling creates a limitation on switch height.

In some situations all parts of the switch and the cable terminal box are set up above the building floor. For this and the installation of the driving motor described above, the arrangement is likewise suitable where the driving motor and the pertinent driving members are attached to a carrying member. The carrying member may then be fastened either to the floor of the cable well or the building floor, or to a supporting structure provided at that location.

Another advantage of the switch is that the contacts of the switch can be provided with shielding devices to reduce the corona effect.

The preferred embodiment of the invention is explained in greater detail below, with reference to the exemplary embodiment illustrated in the figures of the drawing.

DETAILED DESCRIPTION OF THE PREFERRED EMBODIMENT

Figure 1:
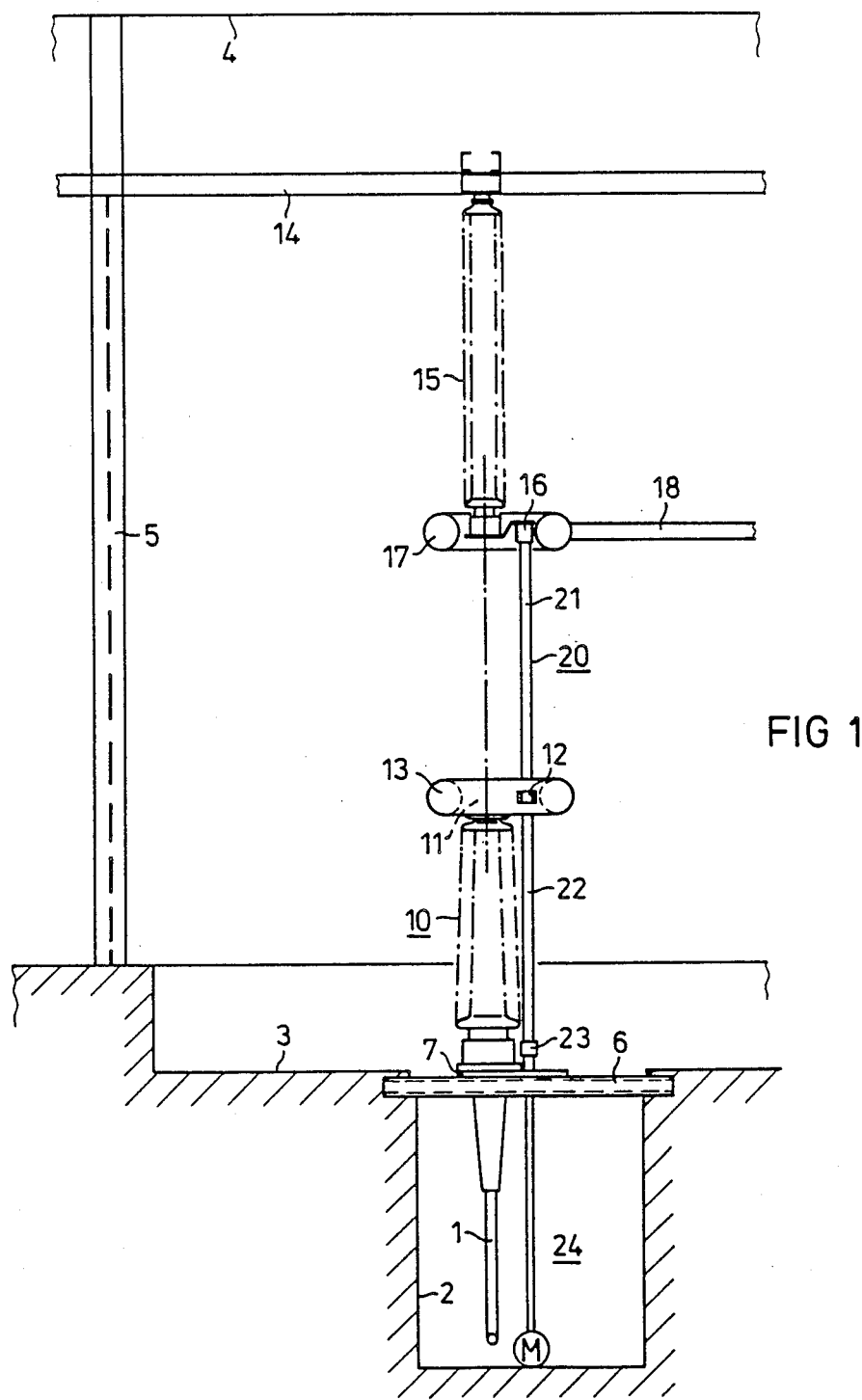
FIG. 1 is a schematic side view of a disconnecting and grounding switch in accordance with the invention.

The principal component parts of the preferred embodiment of the disconnecting and grounding switch will first be explained with reference to FIG. 1. A cable 1 for carrying high voltage can be led into a building (not shown) via a cable well 2. On the cover 6 of the cable well 2, a cable terminal 10 has been mounted with a carrying flange 7. A header 11 of the cable terminal 10 supports a connection contact 12. As a shield against the corona effect, the header 11 and the connection contact 12 are surrounded by a shielding device 13.

A support insulator 15 is attached at its top end to an upper transverse support 14. The transverse support is positioned under the roof 4 and supported by the wall 5. A contact 16 surrounded by a shielding member 17 and coupled to a bus bar 18 is arranged at the lower end of the insulator 15. The connection contact 12 and the contact 16 are arranged vertically one above the other and are connectable by means of a switch rod 20 which is shown in the switched-in position in FIG. 1. The upper section 21 of the switch rod 20, located between the connection contact 12 and the contact 16, functions as a conductor. The lower section 22 of the switch rod 20, extending from the supporting flange 7 of the cable terminal 10 to the connection contact 12, is made non-conductive.

In the position shown in FIG. 1, the switch rod 20 extends through: a lower grounding contact 23 designed as a sliding contact; a contact 12 designed as a sliding contact; and an opening in the shielding member 13. The opening in the shielding member 13 can take the form of through-passage, or an interior space if the shielding member 13 is of a ring shape design. The ground contact 23 is fastened to the grounded supporting flange 7 of the cable terminal 10 or on the cover 6. A drive arrangement 24, shown schematically, for the vertical driving of the switch rod 20, is arranged on the floor of the cable well 2.

As illustrated in the FIG. 1, the disconnecting and grounding switch does not include swivel supports or similar parts which require free space of the switch. The switching movement takes place vertically and parallel to the cable terminal 10, from which only a small lateral distance is required. In the position illustrated, the conductive section 21 of the switch rod 20 connects the contact 16 with.the connection contact 12. Accordingly, the cable 1 is coupled with the high voltage supply conducted to the contact 16 via a bus bar 18. When the switch rod 20 is moved vertically downward by means of the driving arrangement 24, a space results between the contact 16 and the connection contact 12 to open the circuit. In the course of this downward movement, the conductive section 21 automatically connects the connection contact 12 with the grounding contact 23, thereby grounding the cable 1. The details of this switching motion, especially in the range between the connection contact 12 and the drive arrangement 24, are explained below, with reference to FIG. 2.

Figure 2:
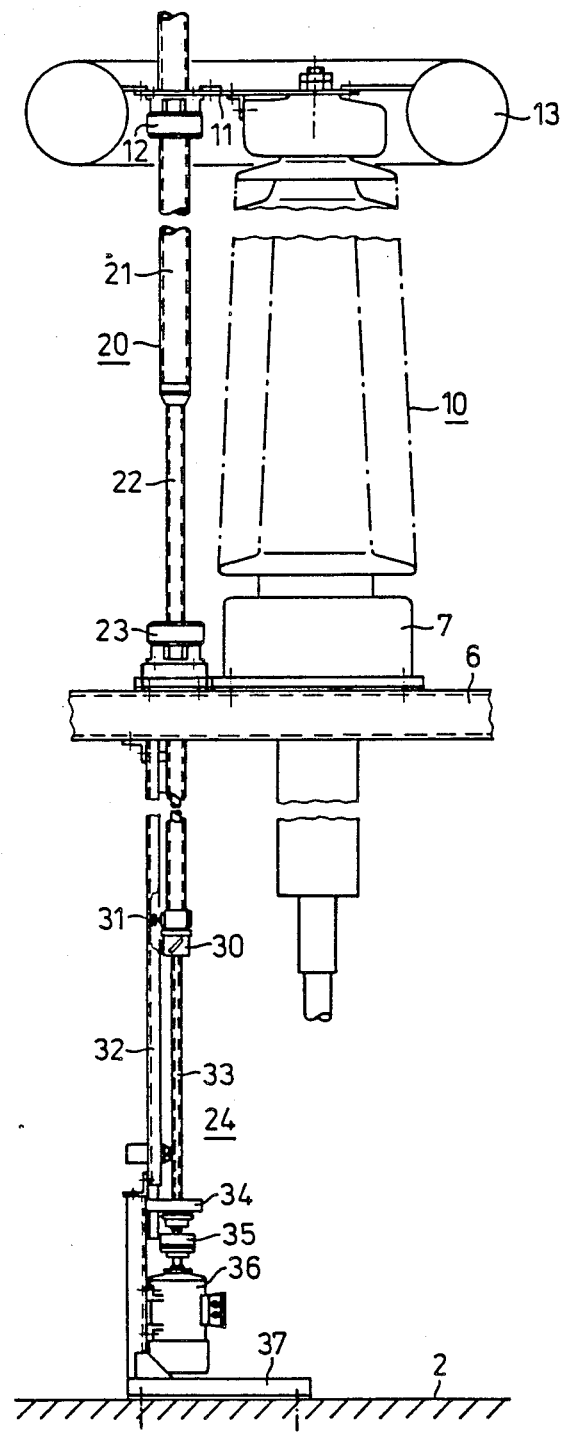
FIG. 2 illustrates an enlarged view of the lower portion of the disconnecting and grounding switch including a cable terminal and a drive arrangement.

FIG. 2 illustrates the lower portion of the switch illustrated in FIG. 1 from the back side. As illustrated, the contact 12 is arranged with the shielding member 13. The switch rod 20 is shown in an intermediate position that does not occur in actual operation, in order to illustrate more clearly the transition from the upper, conductive section 21 to the lower, non-conductive, section 22. Both sections are tubular in form, but designed with differing diameters.

A travelling nut 30 assembly is located at the lower end of the insulating section 22. This nut 30 cooperates with the threads of a rotatable shaft 33 and is prevented from rotating with the threaded shaft 33 by a pin 31. The pin 31 is adapted to slide vertically in a guiding rail 32 of U or C-shaped cross section, wherein the cooperation of the pin 31 and guiding rail 32 prevent the nut 30 from rotating. To reduce friction, a travelling nut assembly 30 including a series of recirculating ball bearings may be used. The top end of the threaded shaft 33 is translatable within the hollow insulating section 22 and the lower end of the threaded shaft 33 is rotatably mounted in a bearing 34. Via a coupling 35, the threaded shaft 33 can be driven directly by the driving motor 36, without an intermediate gear. The desired rotational speed of the threaded shaft 33, which defines the speed at which the switch rod 20 is moved vertically, can be achieved by using a multi-pole drive motor 36 having the appropriate number of poles. By way of example, a rotation speed of about 750 revolutions per minute can be used. An angular support 37 serves to accommodate the driving motor 36 with the coupling 35 and the bearing 34 for the threaded shaft 33. In addition, the support 37 also forms a support for the attachment of the guiding rail 32, wherein the top end of the rail 32 is connected to the cover 6.

As shown in the Figures, the cable well 2 is used to house the driving arrangement 24 and the lower section 22 of the switch rod 20, when the latter is in the switched-out position. This arrangement reduces the construction height of the switch, which is particularly desirable when a relatively high voltage must be controlled in a room of limited height. Whereas when the voltage is lower, and/or adequate space is available, the disconnecting and grounding switch can also be installed directly on the building floor 3, wherein the frame 37 of the driving arrangement 24 provides a means for attachment.

While one embodiment of the switch has been shown and described in detail herein, various other changes and modifications may be made without departing from the scope of the present invention.

We claim:

1. A high voltage disconnecting and grounding switch having a support structure and vertical switching movement comprising:
   a first contact adapted to have a high voltage potential;
   a connection contact connectable with the first contact wherein the first contact and the connection contact are arranged on the support structure vertically one above the other; a grounding contact connectable with the connection contact wherein the connection contact and the grounding contact are arranged on the support structure vertically one above the other; and a vertically translatable switch rod movably mounted to the support structure between closed and open circuit positions, the rod including a conductive section and a nonconductive section, wherein the conductive section connects the first contact and the connection contact when the switch is in the closed position and the conductive section connects the connection contact and the grounding contact when the switch is in the open circuit position.

2. The switch of claim 1, further comprising a cable terminal mounted in.the support structure including a header and a grounded flange, wherein the connection contact is attached to the header and the grounding contact is attached to the grounded flange.

3. The switch of claim 1 wherein the grounding contact surrounds the switch rod and the switch rod is slidably mounted within the grounding contact.

4. The switch of claim 1 further comprising;
   a threaded shaft connected to the lower end of the switch rod;
   a drive motor mounted to the support structure for rotating the threaded shaft; and
   a travelling nut arranged on the threaded shaft, the travelling nut engaging the threaded shaft such that the switch rod translates as the threaded shaft rotates.

5. The switch of claim 4, wherein the drive motor and threaded shaft are arranged in a cable well through which a high voltage cable can pass.

6. The switch of claim 1 further comprising a first shielding member and a second shielding member, wherein the first contact is arranged within the first shielding member and the connection contact is arranged within the second shielding member.

* * * * *